(12) United States Patent
Kim (10) Patent No.: US 7,289,768 B2
(45) Date of Patent: Oct. 30, 2007

(54) PORTABLE TERMINAL CAPABLE OF GUIDING USER TO INVOKE A FUNCTION AND METHOD THEREOF

(75) Inventor: Seon-Mi Kim, Suwon-shi (KR)

(73) Assignee: Samsung Electronics Co., Ltd. (KR)

( * ) Notice: Subject to any disclaimer, the term of this patent is extended or adjusted under 35 U.S.C. 154(b) by 569 days.

(21) Appl. No.: 10/781,501

(22) Filed: Feb. 17, 2004

(65) Prior Publication Data

US 2004/0198475 A1    Oct. 7, 2004

(30) Foreign Application Priority Data

Apr. 7, 2003    (KR) ...................... 10-2003-0021633

(51) Int. Cl.
*H04B 17/00*    (2006.01)
(52) U.S. Cl. .................. 455/67.7; 455/575.1; 455/563; 455/566
(58) Field of Classification Search ............. 455/575.1, 455/563, 426.1, 426.2, 566, 414.1, 412.2, 455/550, 67.7; 345/170, 169; 715/864, 715/705
See application file for complete search history.

(56) References Cited

U.S. PATENT DOCUMENTS

| | | | |
|---|---|---|---|
| 5,182,553 A * | 1/1993 | Kung | 340/7.1 |
| 6,310,609 B1 * | 10/2001 | Morgenthaler | 345/170 |
| 6,470,076 B1 * | 10/2002 | Iwami | 379/67.1 |
| 6,720,863 B2 * | 4/2004 | Hull et al. | 340/7.51 |
| 6,725,064 B1 * | 4/2004 | Wakamatsu et al. | 455/566 |
| 7,017,125 B1 * | 3/2006 | Matsumoto | 715/864 |
| 2002/0004408 A1 * | 1/2002 | Masuda et al. | 455/550 |
| 2002/0049870 A1 * | 4/2002 | Aoki et al. | 710/5 |
| 2003/0125093 A1 * | 7/2003 | One | 455/566 |
| 2005/0026644 A1 * | 2/2005 | Lien | 455/550.1 |

FOREIGN PATENT DOCUMENTS

DE    EP 1 085 500    * 3/2001

* cited by examiner

*Primary Examiner*—Matthew D. Anderson
*Assistant Examiner*—Tan Trinh
(74) *Attorney, Agent, or Firm*—The Farrell Law Firm (57) ABSTRACT

A portable terminal capable of guiding a user to invoke a function and a method thereof. In the portable terminal, a voice detector detects a keyword uttered by voice corresponding to a function; a display displays guide information for guiding a user to access the function and key information indicating at least one key available to access the function, a key interface, having a plurality of keys in hardware or software, illuminates the available key according to the key information in response to an input signal; a storage stores a manual containing the guide information and the key information; and a controller controls the display to display the guide information and the key information according to the manual upon receipt of the keyword, and controls the key interface to illuminate the at least one available key according to the key information.

12 Claims, 15 Drawing Sheets

PORTABLE TERMINAL CAPABLE OF GUIDING USER TO INVOKE A FUNCTION AND METHOD THEREOF

PRIORITY

This application claims priority under 35 U.S.C. § 119 to an application entitled "Portable Terminal Capable of Guiding User to Invoke Function and Method Thereof" filed in the Korean Intellectual Property Office on Apr. 7, 2003 and assigned Serial No. 2003-21633, the contents of which are incorporated herein by reference.

BACKGROUND OF THE INVENTION

1. Field of the Invention

The present invention relates generally to a portable terminal, and in particular, to a portable terminal capable of guiding a user to more easily invoke a function of the portable terminal.

2. Description of the Related Art

In general, a portable terminal is a device that provides wireless communication to users through wireless communication with a base station (BS). This portable terminal is widespread as a necessity irrespective of gender, age and place. For transmission/reception of voice or video data, the portable terminal always includes a transmitter/receiver, a data input/output device, and an antenna.

Figure 1:
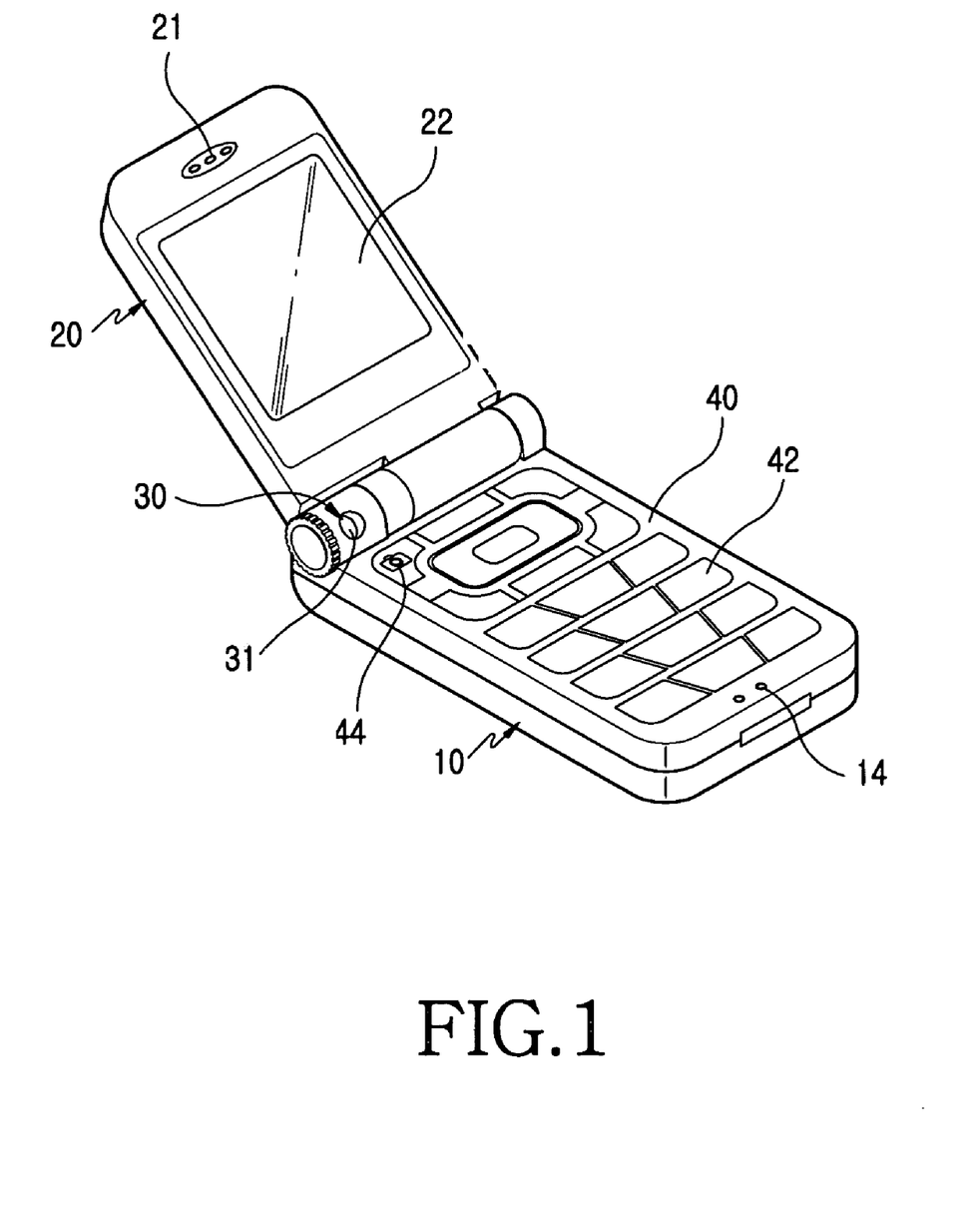
FIG. 1 is a perspective view of a typical folder-type portable terminal.

FIG. 1 is a perspective view of a typical folder-type portable terminal. Referring to FIG. 1, the folder-type terminal includes a main housing 10, a folder 20, a hinge module by which the folder 20 is rotatably connected to the main housing 10, and a lens housing 30 installed rotatably in the hinge module.

The main housing 10 includes a keypad 42 with a plurality of keys and a microphone 14 on its top surface. The lens housing 30 is comprised of a camera lens 31 and a charge coupled device (CCD: not shown). The lens housing 30 is disposed coaxially with the hinge axis of the hinge module and thus rotates about the hinge axis.

When a user purchases a portable terminal, a user manual is also offered. As the portable terminal is equipped with more functions, cost constraints are imposed on a portable terminal provider because he must make and distribute the manual for guiding users to all functions.

Moreover, some users have difficulty in fully understanding the functions of the portable terminal through the manual. Even adept users take time to grasp the contents of the manual. If the user does not carry the manual, he may be unable to access a new function easily. Further, specifically function-related characters new to the user in the manual may frustrate him.

SUMMARY OF THE INVENTION

It is, therefore, an object of the present invention to provide a portable terminal capable of guiding a user without a user manual in learning various functions in an easy-to-follow way, and a method thereof.

It is another object of the present invention to provide a portable terminal capable of guiding a user without a user manual to invoke a function in an easy-to-follow way, and a method thereof.

It is a further object of the present invention to provide a portable terminal capable of visually guiding a user without a user manual to invoke a function in an easy-to-follow way, and a method thereof.

The above objects are achieved by a portable terminal capable of guiding to a function and a method thereof. In the portable terminal, a voice detector detects a keyword uttered by voice corresponding to a function; a display displays guide information for guiding a user to access the function and displays key information indicating at least one key available to access the function; a key interface, having a plurality of keys in hardware or software, illuminates the at least one available key according to the key information in response to an input signal; a storage stores a manual containing the guide information and the key information; and a controller controls the display to display the guide information and the key information according to the manual upon receipt of the keyword and controls the key interface to illuminate the at least one available key according to the key information.

It is preferred that the keyword can be entered in text through the key interface and the controller deals with or interprets the text keyword and the voice keyword as the same keyword.

The portable terminal further includes a voice reader for outputting the key information by voice under the control of the controller, while the key information is displayed on the display and the at least one available key is illuminated. The keys are individually illuminated in at least two colors in the key interface.

In the method of guiding to a function, it is determined whether a keyword corresponding to a function has been received. Upon receipt of the keyword, setting information corresponding to the keyword and key information indicating at least one available key and illuminating the at least one available key are displayed. An operation corresponding to selection of the illuminated key is performed.

It is preferred that the keyword is entered in text or by voice.

It is preferred that in the controlling step, the key information is output by voice while the key information is displayed and the at least one available key is illuminated. It is also preferred that in the key illuminating step, if there is a plurality of available keys, the available keys are illuminated in different colors.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention is described below with reference to the accompanying drawings. In the following description, well-known functions or constructions are not described in detail since they would obscure the invention in unnecessary detail.

Figure 2:
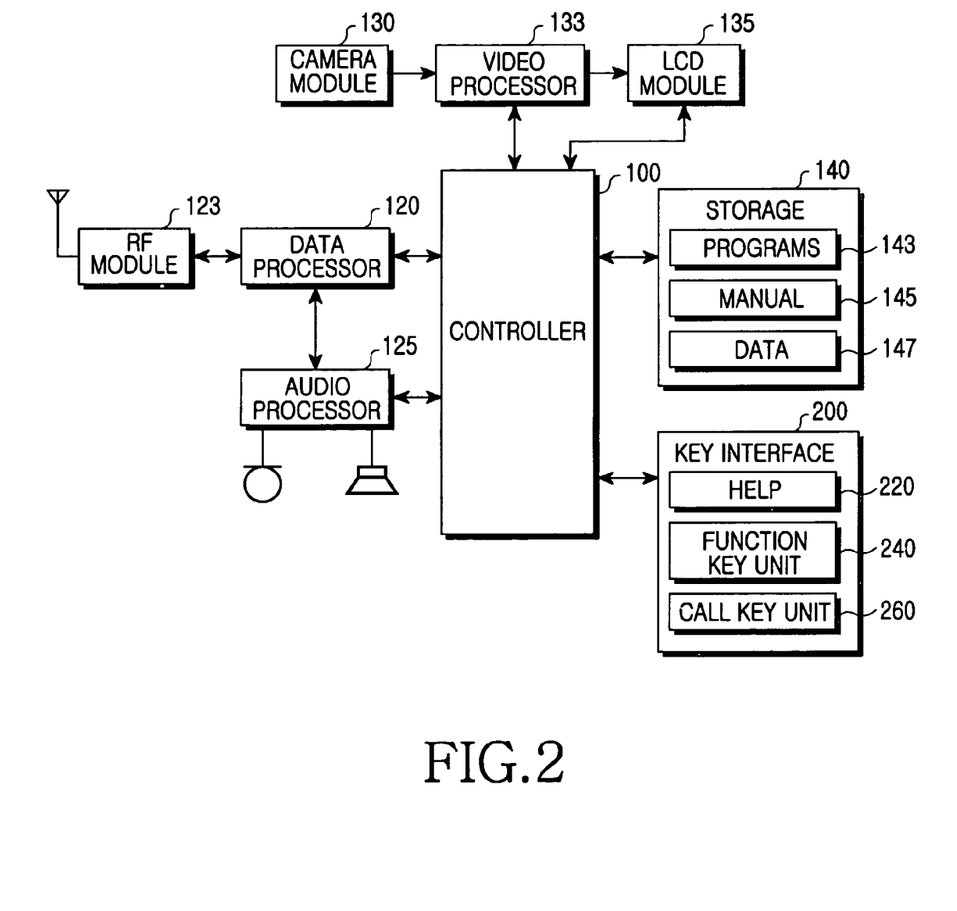
FIG. 2 is a block diagram of a portable terminal capable of guiding to function invocation according to a preferred embodiment of the present invention.

FIG. 2 is a block diagram of a portable terminal capable of guiding a user to invoke a function according to a preferred embodiment of the present invention.

Referring to FIG. 2, a radio frequency (RF) module 123, taking charge of wireless communication for the portable terminal, includes an RF transmitter for upconverting the frequency of a transmission signal and amplifying it and an RF receiver for low-noise-amplifying a received signal and downconverting the frequency of the amplified received signal. A data processor 120 may have a MODEM for encoding and modulating the transmission signal and a CODEC for demodulating and decoding the signal received from the RF module 123. The CODEC is comprised of a data CODEC for processing packet data and an audio CODEC for processing an audio signal including voice. An audio processor 125 reproduces an audio signal received from the audio CODEC or transmits an audio signal generated from a microphone to the audio CODEC.

A camera module 130 photographs an object captured through a lens. The camera module 130 is comprised of a camera sensor for converting the optical signal to an electrical signal, and a signal processor for digitizing an analog video signal received from the camera sensor. The camera sensor can be, for example, a CCD sensor and the signal processor can be, for example, a digital signal processor (DSP). The camera sensor and the signal processor are integrally or separately formed.

A video processor 133 generates video data from the video signal received from the camera 130 to be displayed. The video processor 133 processes the video signal on a frame-by-frame basis and outputs frame video data according to the resolution and size of an LCD module 135. The video processor 130 includes a video CODEC for compressing the frame video data using a predetermined method and for recovering original frame video data from compressed frame video data. For example, a JPEG CODEC, MPEG4 CODEC, or Wavelet CODEC can be used as the video CODEC. The video processor 133 is provided with an on screen display (ODS) functionality and outputs video data and OSD data in combination under the control of a controller 100.

The LCD module 135 displays the video data received from the video processor 133 and user data received from the controller 100 on an LCD. The LCD module 135 may include an LCD controller, a memory for storing video data, and the LCD. If the LCD module 135 is implemented as a touch screen, it can cofunction as an input device.

A storage 140 stores programs 143, a manual 145, and data 147. The programs 143 are for controlling the whole operation of the portable terminal, the manual 145 is a guide for guiding a user to learn the functions of the portable terminal, and the data 147 is generated during execution of the programs 143.

A key interface 200 has a plurality of keys that can be illuminated individually, for allowing the user to enter a command. The key interface 200 can be realized in hardware or in software by displaying individually light-emitting keys on a screen such as, for example, a touch pad as in an electronic device including a personal digital assistant (PDA).

According to the preferred embodiment of the present invention, the key interface 200 includes a HELP key 220, a call key unit 260, and a function key unit 240. The HELP key 220 is used to request a manual by which to learn to invoke a function. Upon selection of the HELP key 220, the controller 100 displays a menu on the LCD module 135 to prompt the user to select a contents search or a keyword search for the manual.

If the keyword search is selected and a keyword is entered, the controller 100 displays titles or indexes containing the keyword on the LCD module 135. If one of the titles is selected, the controller 100 guides the user to a function corresponding to the selected title according to the manual 145 stored in the storage 140 by prompting the user to do as instructed.

The function key unit 240 aids the user to access a menu or a function more rapidly and easily. The HELP key 220 can be included in the function key unit 240. The call key unit 260 is used to enter digits and characters for a voice call with an external device.

The key interface 200 is configured so that each individual key is illuminated according to key input irrespective of hardware implementation or software implementation. In the case of software implementation, individual soft keys displayed on a screen in a PDA, for example, are illuminated, darkened, or colored according to control signals.

Upon selection of the HELP key 220, the controller 100 illuminates a key to be selected during guiding to alert the user for key selection. The controller 100 also outputs a message visually on the LCD module 135, or audibly through a speaker, prompting the user to press the illuminated key.

That is, upon selection of the HELP key 220 and input of a command to run a particular function, keys to be selected are illuminated during guiding according to the manual 145. Therefore, even users slow in learning the manual in text form can easily access functions of the portable terminal through visual or audible guiding. As a result, the portable terminal is further utilized and is user-friendly enough to attract a wider range of users.

Figure 3:
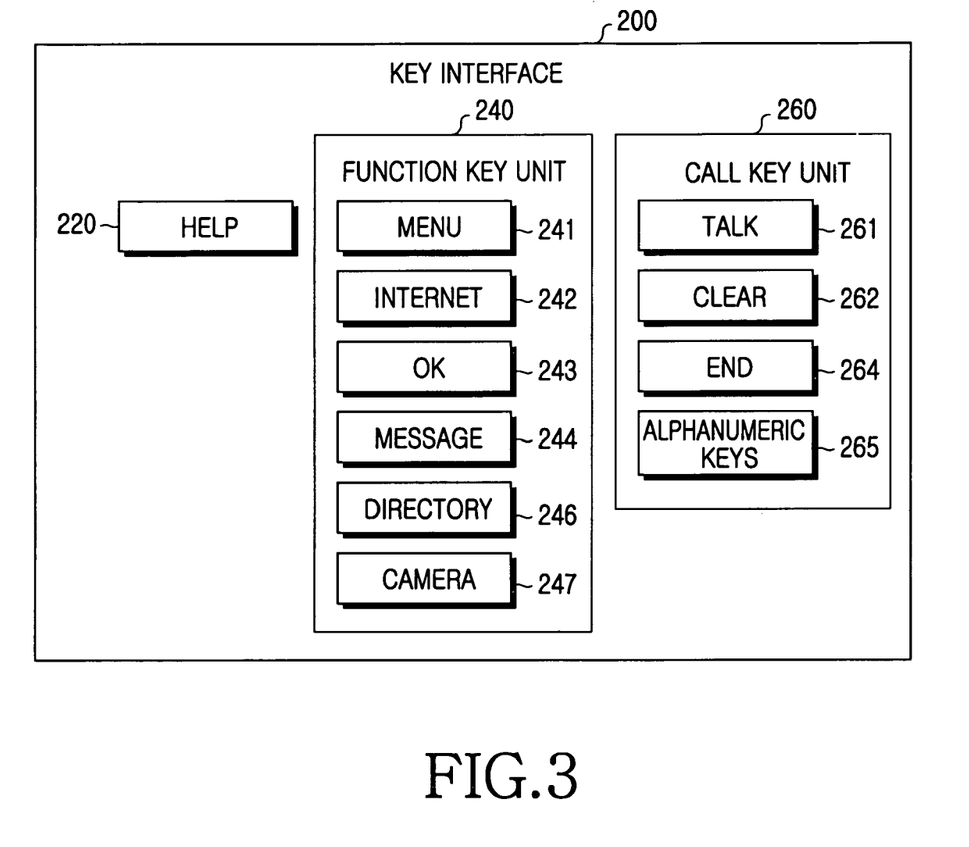
FIG. 3 is a block diagram of a key interface illustrated in FIG. 2.

FIG. 3 is a detailed block diagram of the key interface 200. The key interface 200 is comprised of the HELP key 220, the function key unit 240, and the call key unit 260. The HELP key 220 is used to request the user manual. The function key unit 240 includes a MENU key 241 for providing an initial screen display to enable the user to select a menu item corresponding to a function, an Internet key 242 for wireless communication, an OK key 243 for selecting a function displayed on the LCD module 135 and storing a changed function, a MESSAGE key 244 for transmitting and managing text and voice messages, a DIRECTORY key 246 for managing phone numbers, and a CAMERA key 247 for setting a camera mode and photographing an object captured through the camera module 130.

According to the preferred embodiment of the present invention, the function keys in the function key unit 240 are individually-illuminated under the control of the controller 100 to facilitate user selection.

The call key unit 260 includes a TALK key 261, a CLEAR key 262, an END key 264, and alphanumeric keys 265. The TALK key 261 dials a phone number displayed on the LCD module 135. The CLEAR key 262 is used to cancel a particular operation. The END key 264 ends an ongoing operation, and the alphanumeric keys 265 are used to enter digits and characters. The keys in the call key unit 260 are individually illuminated by use of light emitting devices under the control of the controller 100. This configuration is also applicable to a key interface implemented in software in an electronic device like a PDA. To prompt the user to input a key in the call key unit 260 during an operation, the controller 100 illuminates the key.

Meanwhile, the portable terminal according to the present invention can provide the manual guide service by voice through the microphone. For example, when "HELP" is uttered through the microphone, the controller 100 operates in the same manner as when the HELP key 220 is selected. Specifically, the controller 100 displays on the LCD module 135 guiding messages for contents search and keyword search of the manual 145 stored in the storage 140.

Figure 4:
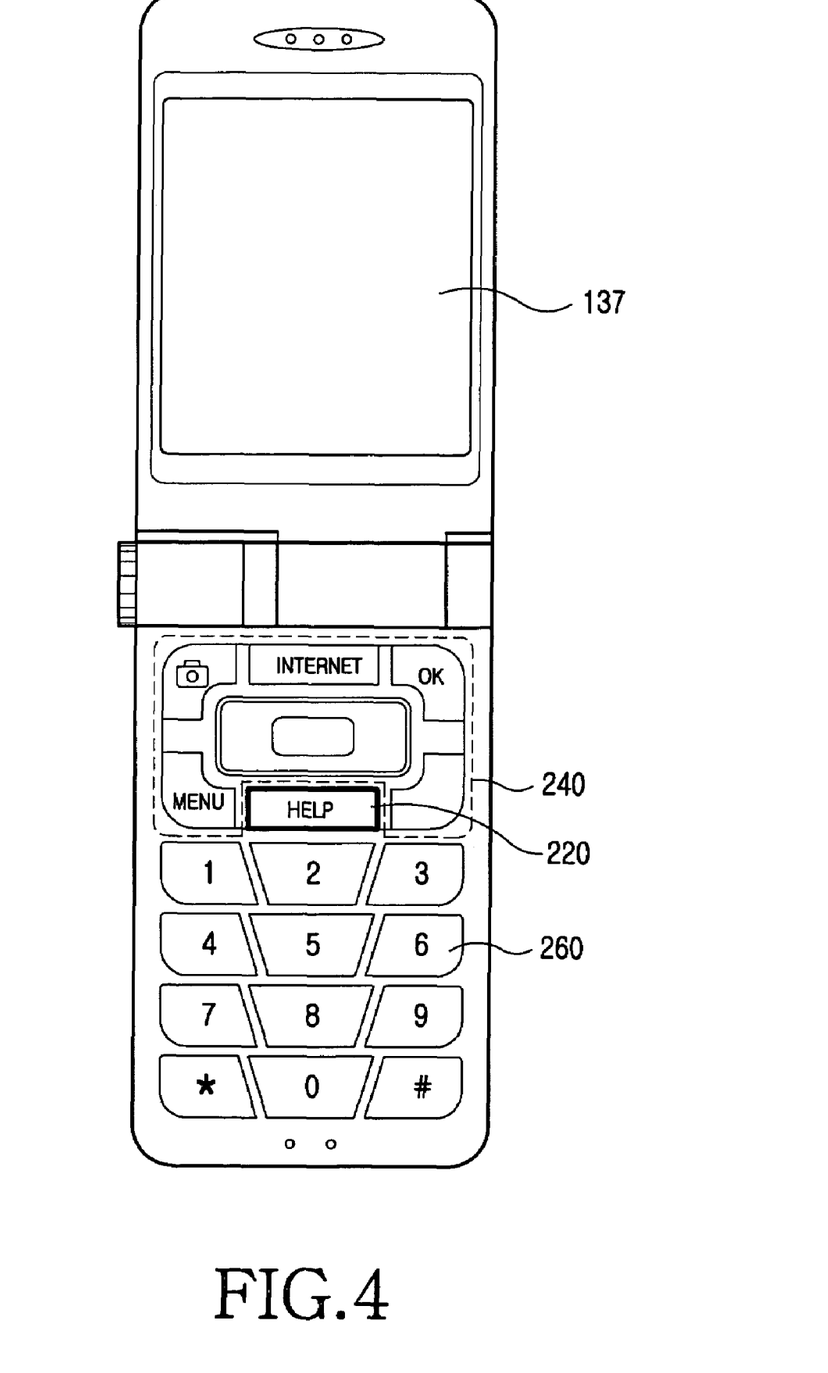
FIG. 4 illustrates a portable terminal having the key interface configured as illustrated in FIG. 3.

FIG. 4 is a front view of a portable terminal configured as illustrated in FIGS. 2 and 3 according to the embodiment of the present invention. In an open state, the portable terminal has a screen 137 for displaying the operation state of the portable terminal in an upper portion and a key interface in a lower portion. The key interface includes the HELP key 220, the function key unit 240, and the call key unit 260. According to the preferred embodiment of the present invention, upon selection of the HELP key 220, the controller 100 starts to guide the user.

Figure 5A:
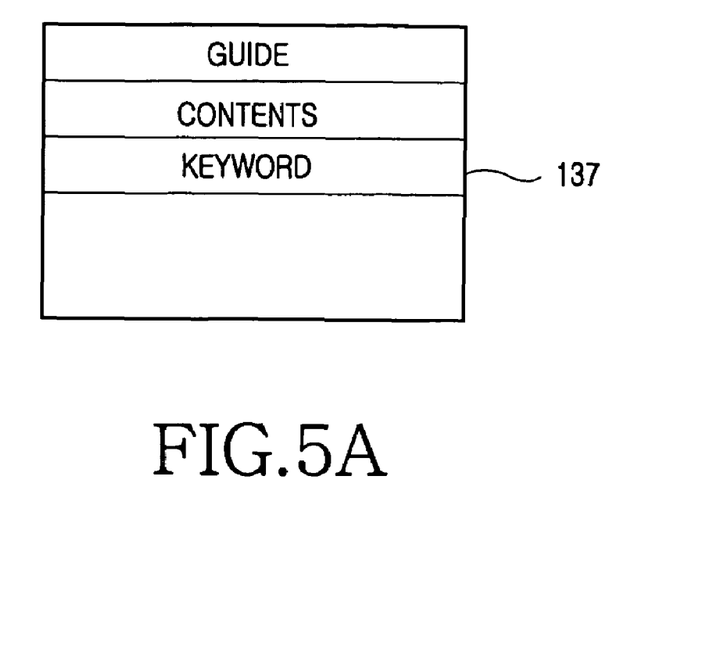
FIGS. 5a and 5B illustrate screen displays invoked when a HELP key illustrated in FIG. 4 is selected.
Figure 5B:
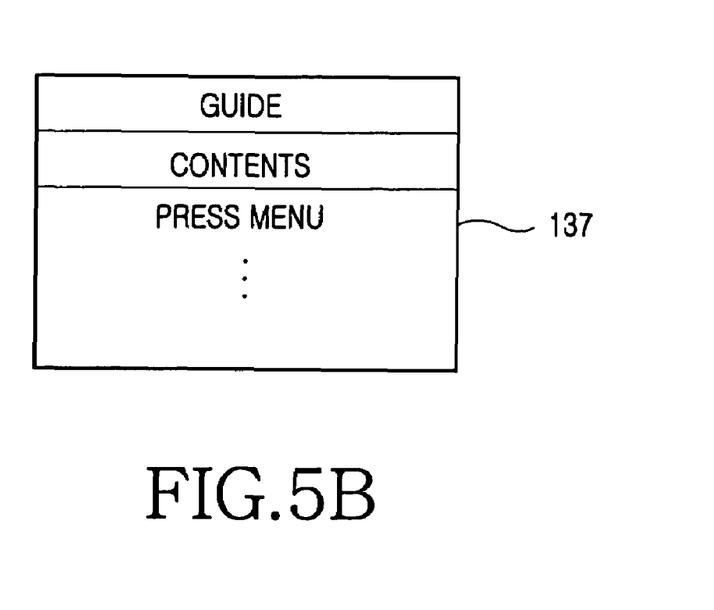

FIGS. 5A and 5B illustrate screen displays invoked when the HELP key 220 is selected. Upon selection of the HELP key 220, the controller 100 displays a message indicating a help mode on the screen 137. At the same time, the controller 100 displays search selection information on the screen 137 to prompt the user to select a contents search or a keyword search. The keyword search is selected in FIG. 5A.

If the user enters "Morning Call", the controller 100 displays guide information for Morning Call on the screen 137 as illustrated in FIG. 5B. The user then manipulates the portable terminal according to the guide information, to thereby use and learn the function.

Figure 6:
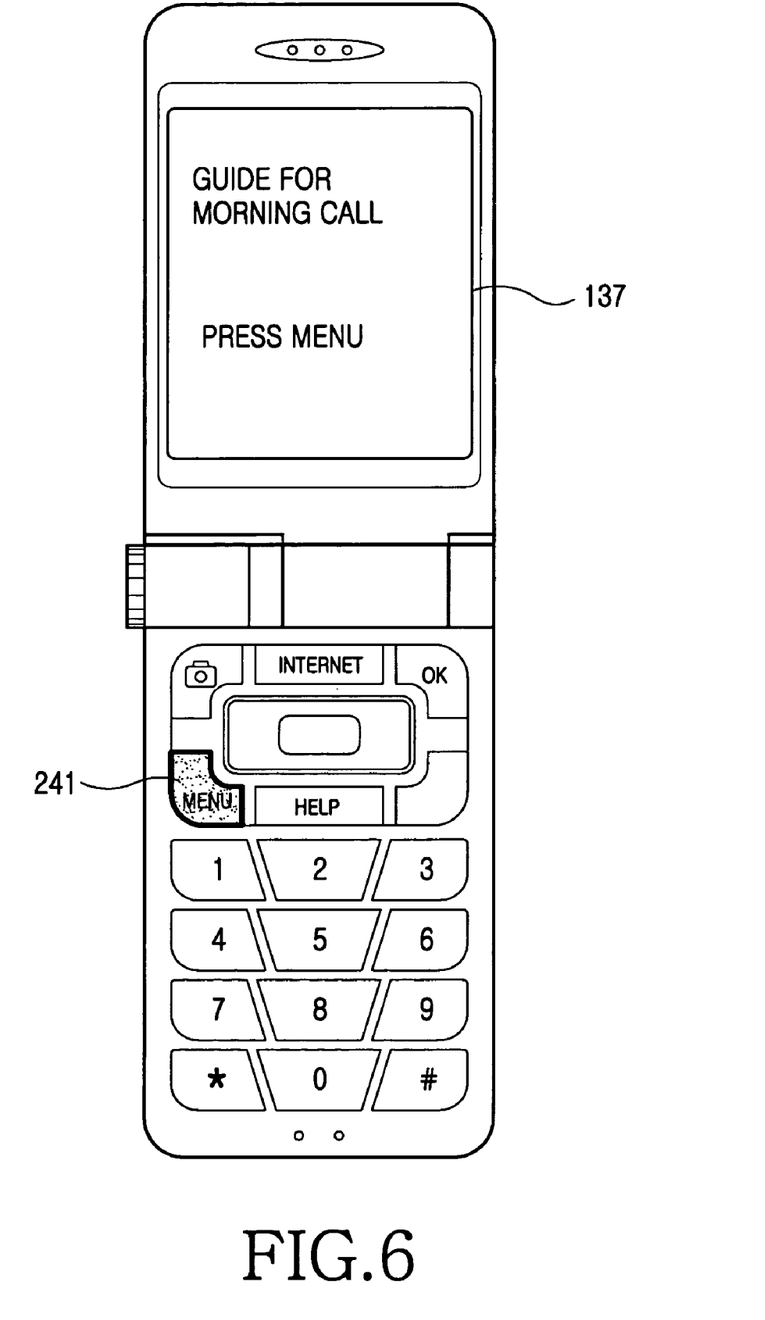
FIGS. 6 to 14 sequentially illustrate guide states for setting "Morning Call"

FIGS. 6 to 14 sequentially illustrate guide states for Morning Call. Referring to FIG. 6, the controller 100 displays on the screen 137 a message indicating a guide for Morning Call. In the first step for Morning Call, the controller 100 prompts the user to select the MENU key 241 by displaying MENU. At the same time, the controller 100 turns on a light emitting device under the MENU key 241. The user then presses the MENU key 241.

Figure 7:
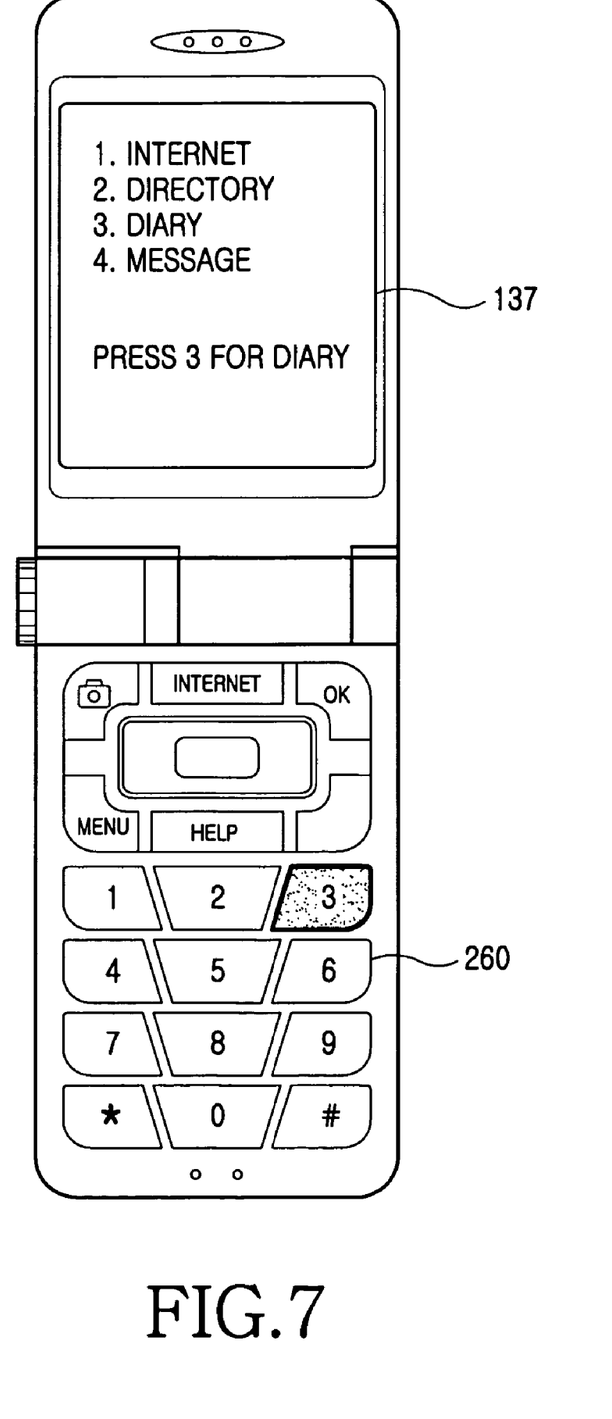

Referring to FIG. 7, upon selection of the MENU key 241, a function list is displayed on the screen 137 with a message prompting the user to press 3 for Electronic Diary. The controller 100 illuminates 3 among the alphanumeric keys 200.

Figure 8:
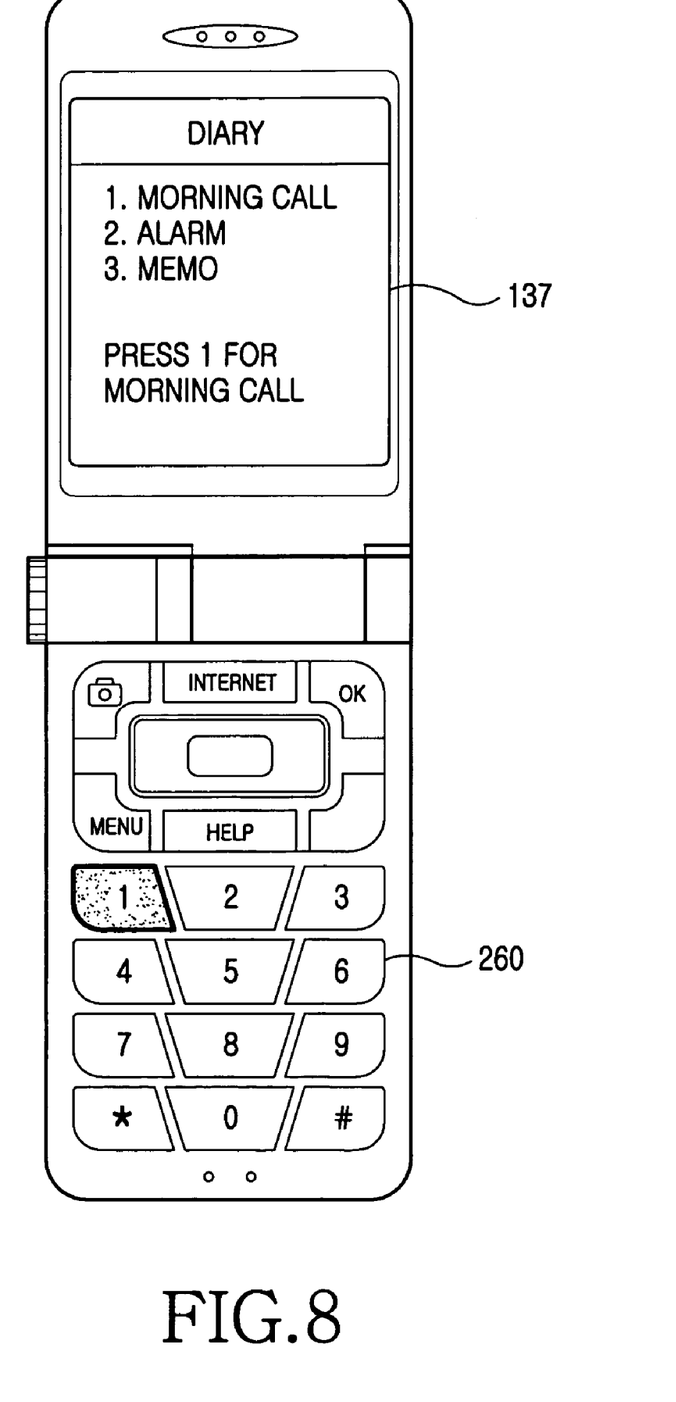

Referring to FIG. 8, upon selection of 3, a function list under the Electronic Diary menu is displayed on the screen 137 with a message prompting the user to press 1 for Morning Call. The controller 100 also illuminates 1 among the alphanumeric keys 200.

Figure 9:
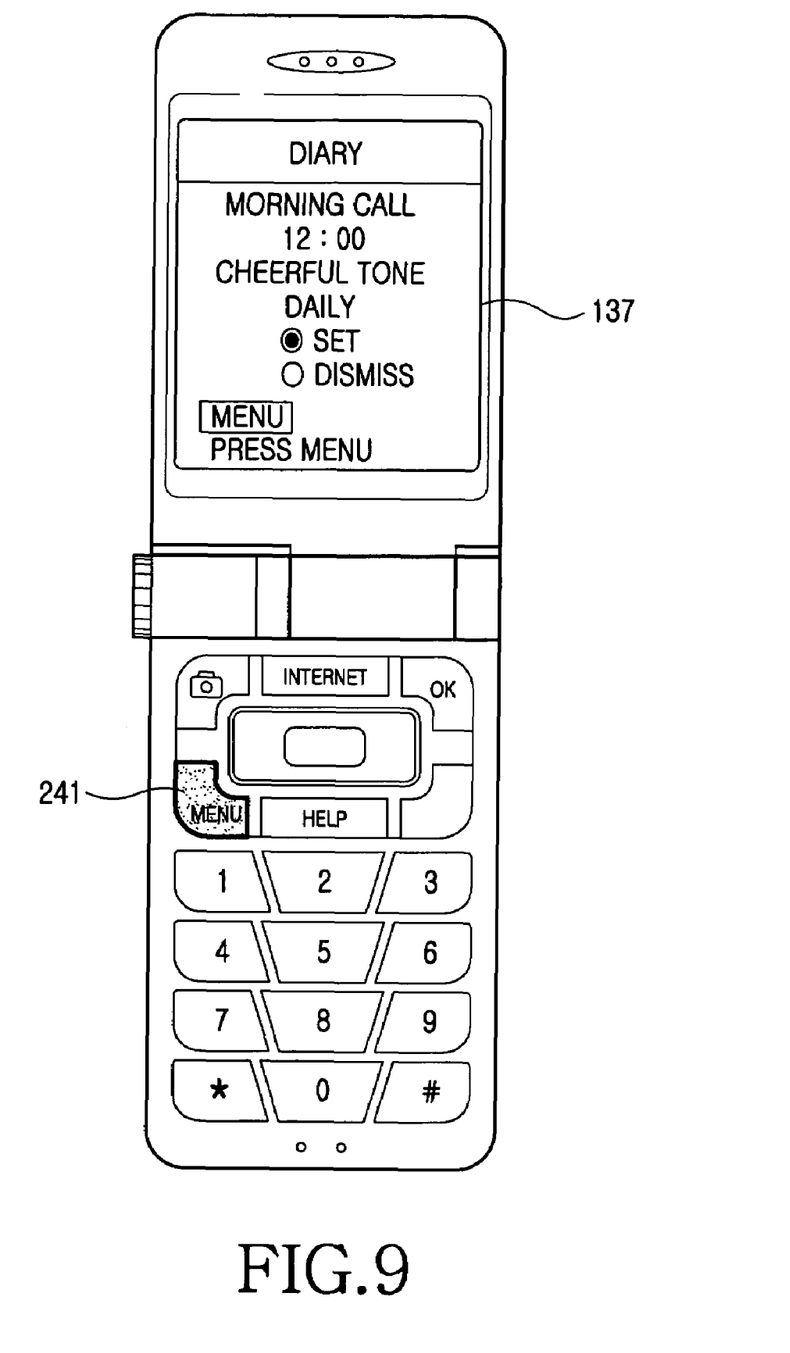

Referring to FIG. 9, when the user presses 1, setting information for Morning Call is displayed on the screen 137 with a message prompting the user to press the MENU key 241. The controller 100 illuminates the MENU key 241.

Figure 10:
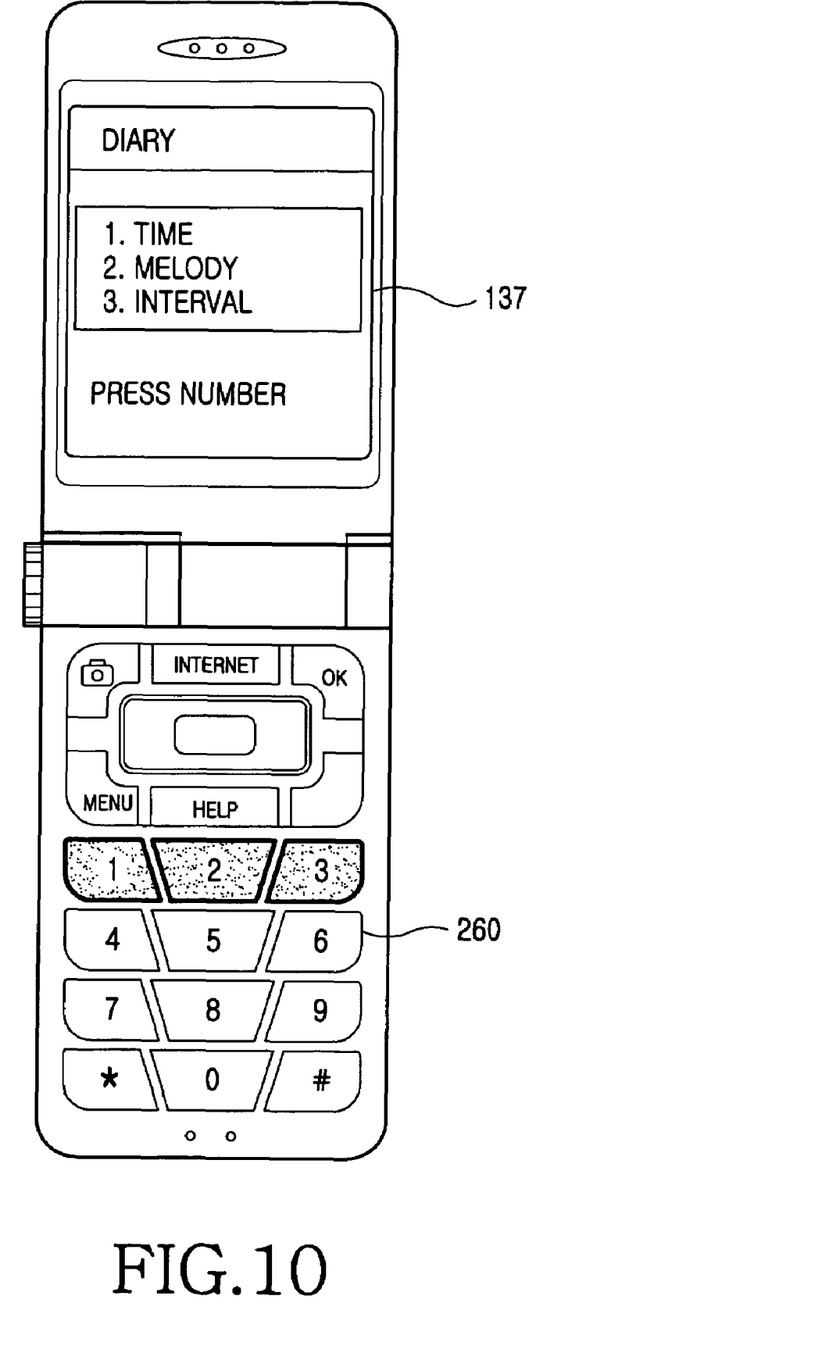

Referring to FIG. 10, upon selection of the MENU key 241, available items for setting Morning Call are displayed on the screen 137. The setting items include time, melody, and morning call interval which are numbered sequentially. The controller 100 illuminates the sequence numbers.

Figure 11:
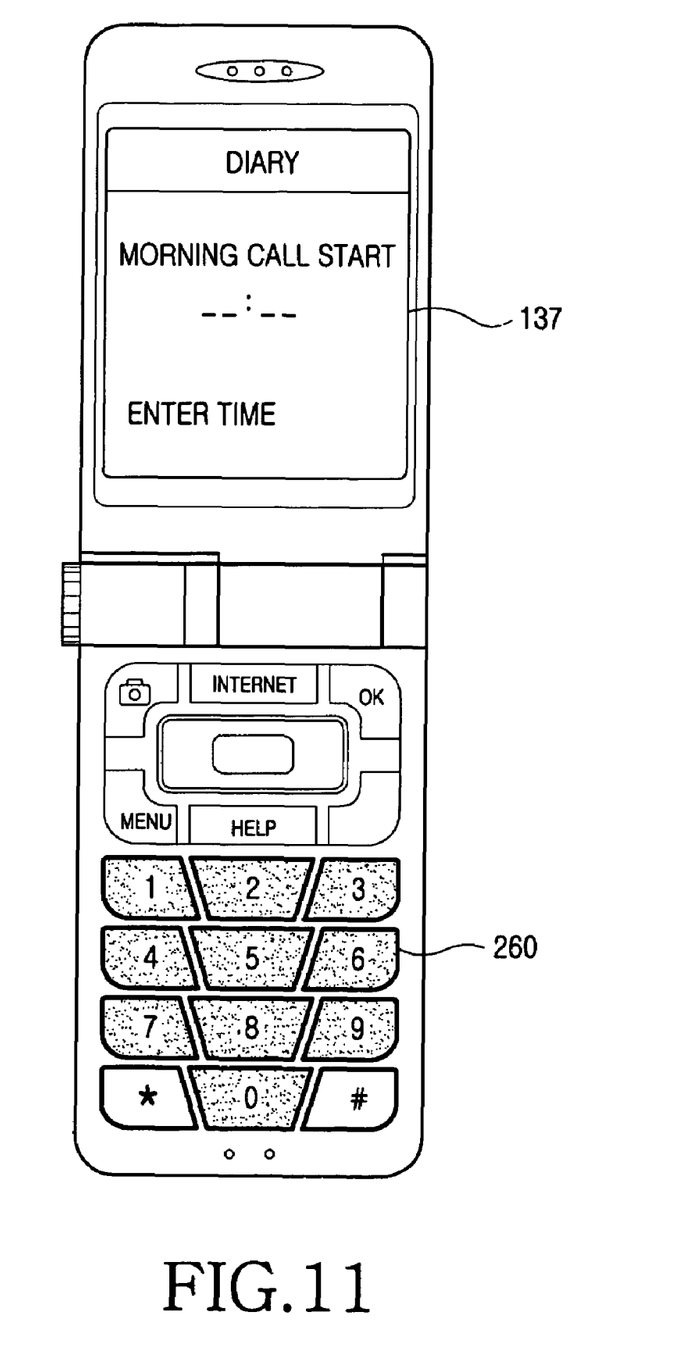

Referring to FIG. 11, upon selection of 1, time setting information is displayed on the screen 137 with a message prompting the user to enter time using numeric keys. The controller 100 illuminates the numeric keys available for setting the time.

Figure 12:
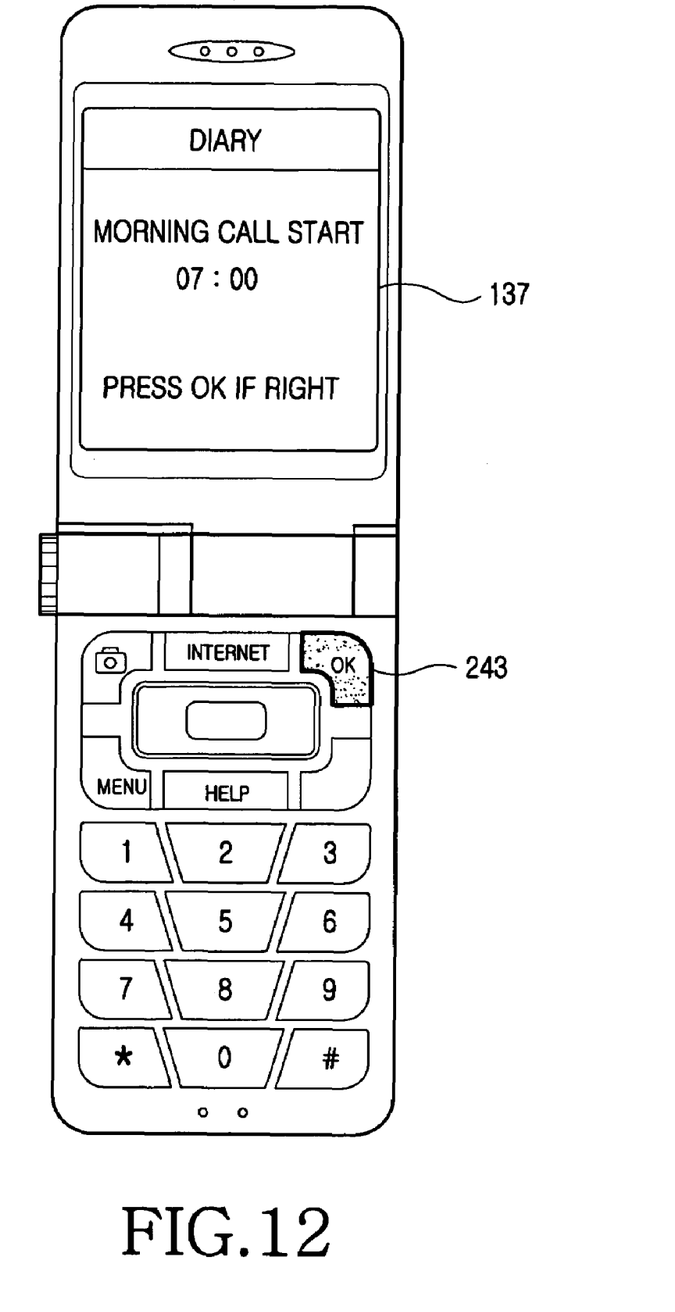

Referring to FIG. 12, after the user sets the time, the time is displayed on the screen 137 with a message prompting the user to press the OK key 243 if the time is right. The controller 100 illuminates the OK key 243.

Figure 13:
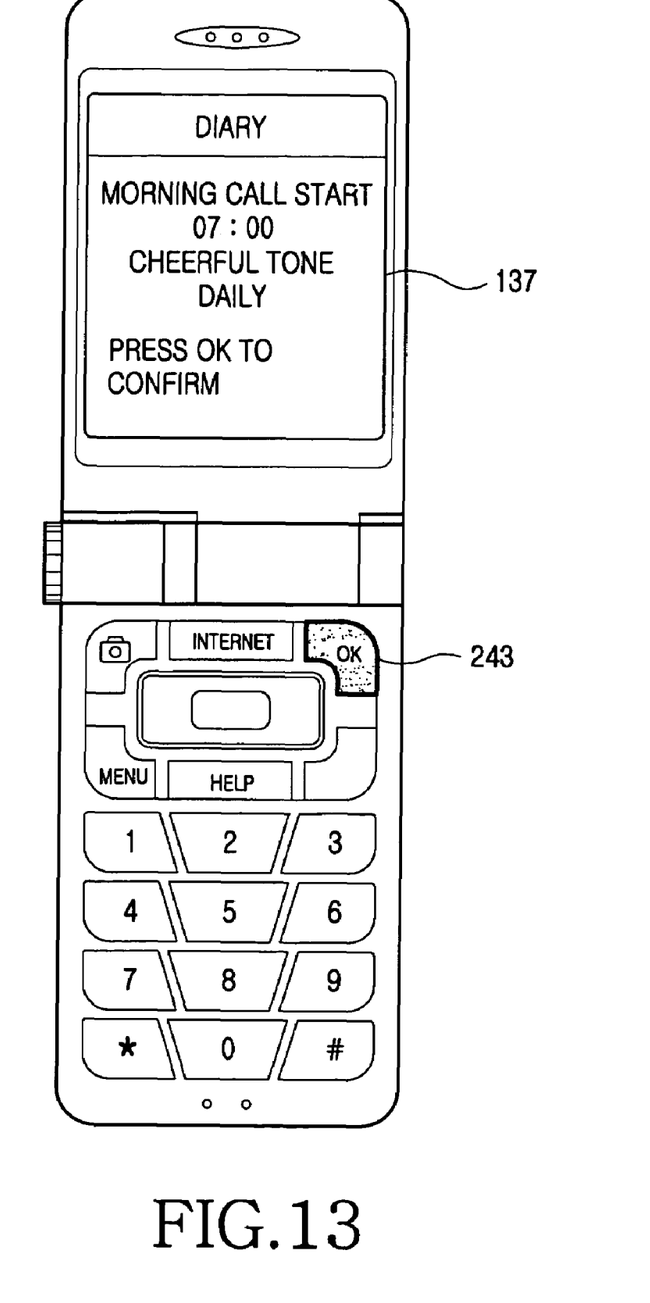

Referring to FIG. 13, upon selection of the OK key 243, a message prompting the user to press the OK key 243 again to set the time for Morning Call is displayed on the screen 137. The controller 100 illuminates the OK key 243.

Figure 14:
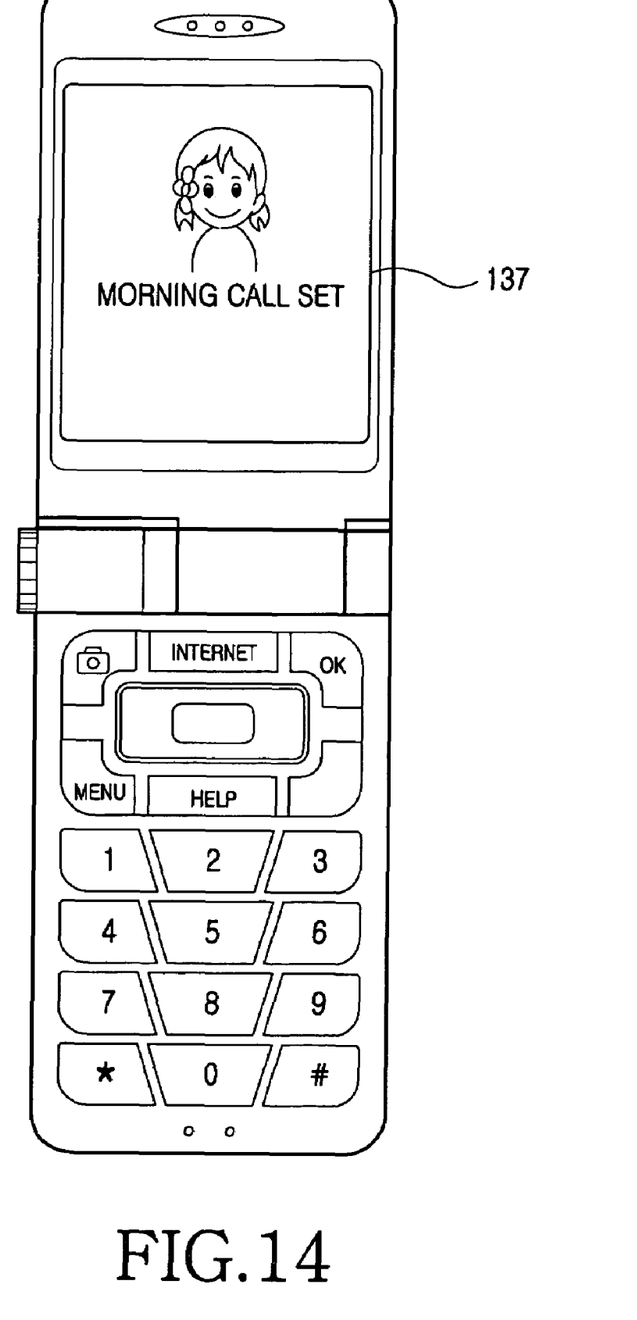

Referring to FIG. 14, upon selection of the OK key 243, a message notifying completed Morning Call setting is displayed on the screen 243.

While the controller 100 guides the user to a function, for example, Morning Call, selected by an audible keyword input through the microphone in the embodiment of the present invention, it is obvious that the keyword can be input in text. Also, guide information about keys to be selected can be announced by voice through the speaker instead of illuminating the keys.

If a text message is received, it can be announced by illuminating the individual letters of the title of the text message. If the text message is short, the short message is illuminated or keys are illuminated in the shape of a known symbol representing the short message. For example, upon receipt of LOVE, the controller 100 illuminates keys in the shape of LOVE or in the shape of ♥. LOVE can also be displayed on the screen 137. If the symbol ♥ itself is received, the controller 100 also illuminates keys in the shape of the symbol ♥.

When a melody is output, the keys can be illuminated according to its note pitches. In addition, the keys can be illuminated in different colors to facilitate user selection of illuminated keys.

Figure 15:
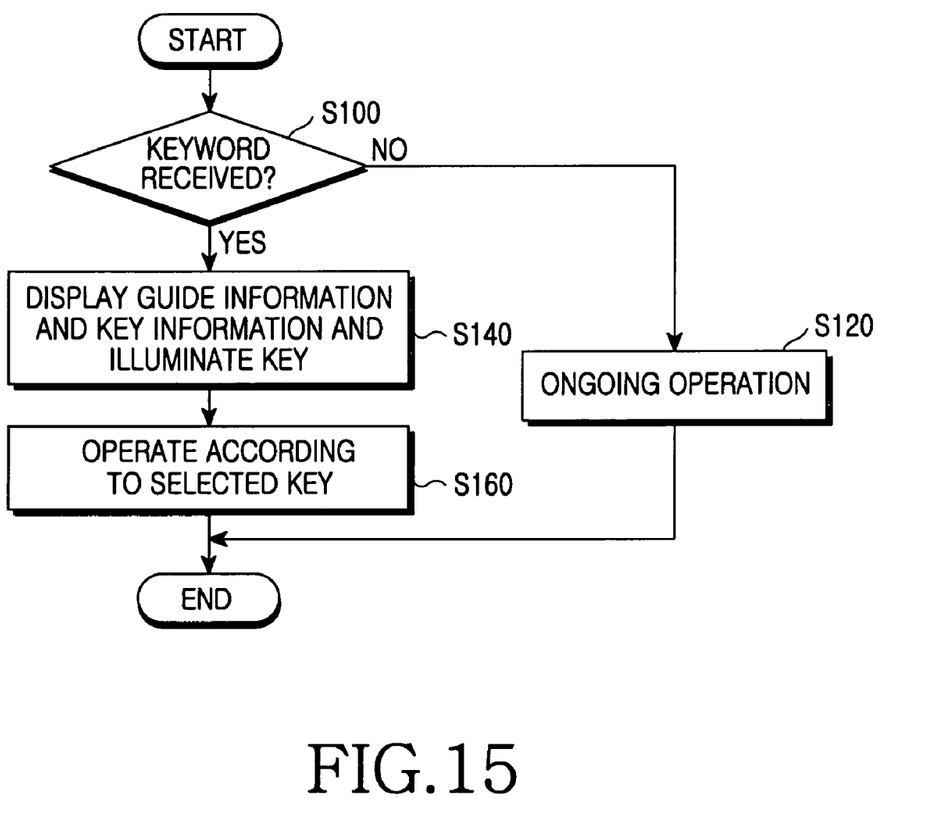
FIG. 15 is a flowchart illustrating a method of guiding to function invocation in the portable terminal according to the preferred embodiment of the present invention.

FIG. 15 is a flowchart illustrating a method of guiding a user to a function according to the embodiment of the present invention.

Referring to FIG. 15, the controller 100 determines whether a keyword has been received in step S100. The keyword is entered in text or uttered by voice.

If the keyword has not been received yet, the controller 100 continues an ongoing operation in step S120. Upon receipt of a keyword, the controller 100 controls the LCD module 135 to display setting information corresponding to the keyword and key guide information on the screen 137 in step S140. At the same time, the controller 100 illuminates a key corresponding to the key guide information. Each time an available key is changed, the new available key is illuminated.

The controller 100 then performs an operation corresponding to the key input in step S160. In the presence of further relevant guide information, the controller 100 displays guide information and at least one available key corresponding to the guide information on the screen 137, and illuminates the key.

In accordance with the present invention as described above, a user manual for introducing a user to functions for a portable terminal is stored. Upon selection of a HELP key and a command for invoking a particular function, available keys are illuminated and also announced in text messages or by voice. Therefore, users can learn and utilize the functions more effectively and a wider range of people can be attracted to purchase portable terminals.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A portable terminal comprising:
   a voice detector for detecting a keyword uttered by voice corresponding to a function;
   a display for displaying guide information for guiding a user to access the function and key information indicating at least one key available to access the function;
   a key interface having a plurality of keys in hardware or software, for illuminating the at least one available key according to the key information in response to an input signal, the plurality of keys including a HELP key for requesting a user manual containing the guide information and the key information;
   a storage for storing the user manual; and
   a controller for controlling voice input and key pressing input of the portable terminal, for controlling voice output and image output of the portable terminal, for controlling the display to display the guide information and the key information according to the manual upon receipt of the keyword, and for controlling the key interface to illuminate the at least one available key according to the key information,
   wherein the keyword is provided by at least one of keyword voice input and keyword key pressing input.

2. The portable terminal of claim 1, wherein the keyword can be entered in text through the key interface and the controller interprets the text keyword and the voice keyword as the same keyword.

3. The portable terminal of claim 1, further comprising a voice reader for outputting the key information by voice under the control of the controller, while the key information is displayed on the display and the at least one available key is illuminated.

4. The portable terminal of claim 1, wherein, if there is a plurality of available keys, the available keys are individually illuminated in at least two colors in the key interface.

5. A method of guiding a user to a function in a portable terminal, comprising the steps of:
   activating a HELP key to request display of a user manual containing guide information and key information;
   determining whether a keyword entered by one of key pressing and voice and corresponding to a function has been received;
   displaying setting information corresponding to the keyword and key information indicating at least one available key and illuminating the at least one available key upon receipt of the keyword; and
   performing an operation corresponding to selection of the illuminated at least one available key,
   wherein the setting information is presented by at least one of screen display and voice.

6. The method of claim 5, wherein the keyword is entered in text or by voice.

7. The method of claim 5, wherein while displaying setting information, the key information is output by voice while the key information is displayed and the at least one available key is illuminated.

8. The method of claim 5, wherein in the key illuminating step, if there is a plurality of available keys, the available keys are individually illuminated in at least two colors in the key interface.

9. An electronic device comprising:
   a voice detector for detecting a keyword uttered by voice corresponding to a function;
   a display for displaying guide information for guiding a user to access the function and key information indicating at least one available key to access the function;
   a key interface having a plurality of keys in hardware or software, for illuminating the at least one available key according to the key information requested by an input signal, the plurality of keys including a HELP key for requesting a user manual containing the guide information and the key information;
   a storage for storing the user manual; and
   a controller for controlling voice input and key pressing input of the portable terminal, for controlling voice output and image output of the portable terminal, for controlling the display to display the guide information and the key information according to the manual upon receipt of the keyword, and for controlling the key interface to illuminate the at least one available key according to the key information,
   wherein the keyword is provided by at least one of keyword voice input and keyword key pressing input.

10. The electronic device of claim 9, wherein the keyword can be entered in text through the key interface and the controller interprets the text keyword and the voice keyword as the same keyword.

11. The electronic device of claim 10, further comprising a voice reader for outputting the key information by voice under the control of the controller, while the key information is displayed on the display and the at least one available key is illuminated.

12. The electronic device of claim 11, wherein the keys are individually illuminated in at least two colors in the key interface.

* * * * *